(12) United States Patent
Markowitz et al.

(10) Patent No.: US 10,696,136 B2
(45) Date of Patent: Jun. 30, 2020

(54) METHOD FOR MOTOR VEHICLE INTERIOR CLIMATE CONTROL

(71) Applicant: Ford Global Technologies, LLC, Dearborn, MI (US)

(72) Inventors: Markus Markowitz, Cologne (DE); Dietmar Fischer, Cologne (DE); Walter Mayer, Bruehl (DE)

(73) Assignee: Ford Global TEchnologies, LLC, Dearborn, MI (US)

( * ) Notice: Subject to any disclaimer, the term of this patent is extended or adjusted under 35 U.S.C. 154(b) by 445 days.

(21) Appl. No.: 15/427,772

(22) Filed: Feb. 8, 2017

(65) Prior Publication Data

US 2017/0144505 A1    May 25, 2017

Related U.S. Application Data

(62) Division of application No. 12/984,554, filed on Jan. 4, 2011, now Pat. No. 9,586,459.

(30) Foreign Application Priority Data

Jan. 7, 2010 (DE) ........................ 10 2010 000 727

(51) Int. Cl.
*B60H 1/00* (2006.01)
*B60H 1/04* (2006.01)

(52) U.S. Cl.
CPC ..... *B60H 1/00885* (2013.01); *B60H 1/00735* (2013.01); *B60H 1/00971* (2013.01); *B60H 1/00978* (2013.01); *B60H 1/04* (2013.01); *B60H 2001/00733* (2019.05)

(58) Field of Classification Search
CPC ............ B60H 1/00885; B60H 1/00735; B60H 1/00971; B60H 1/00978; B60H 1/04; B60H 2001/00733
See application file for complete search history.

(56) References Cited

U.S. PATENT DOCUMENTS

| | | |
|---|---|---|
| 2,820,198 A | 1/1958 | Cayzac |
| 4,272,015 A | 6/1981 | Houser |
| 4,696,167 A | 9/1987 | Matsui et al. |
| 5,427,313 A | 6/1995 | David, Jr. et al. |
| 5,511,724 A | 4/1996 | Freiberger et al. |

(Continued)

FOREIGN PATENT DOCUMENTS

| | | |
|---|---|---|
| DE | 1159520 B1 | 12/1963 |
| EP | 1159520 B1 | 12/2004 |

*Primary Examiner* — Nicholas Kiswanto
(74) *Attorney, Agent, or Firm* — David Coppoellie; Brooks Kushman P.C.

(57) ABSTRACT

A method for climate control for an interior of a motor vehicle includes acquiring climatically relevant data of the interior and/or surroundings of the vehicle, creating a thermodynamic model of a vehicle climate system, the model including at least one of a first thermal capacity of the interior and a first heat loss of the interior, introducing into the interior a quantity of air having a temperature different from an existing interior temperature, calculating at least one of a second thermal capacity of the interior and a second heat loss of the interior existing after the air quantity is introduced into the interior, and adapting the thermodynamic model to include at least one the second thermal capacity and the second heat loss.

6 Claims, 5 Drawing Sheets

(56) References Cited

U.S. PATENT DOCUMENTS

| | | | |
|---|---|---|---|
| 5,735,134 | A | 4/1998 | Liu et al. |
| 5,755,378 | A | 5/1998 | Dage et al. |
| 6,209,794 | B1 | 4/2001 | Webster et al. |
| 6,293,115 | B1 | 9/2001 | Forrest et al. |
| 6,454,178 | B1 | 9/2002 | Fusco et al. |
| 6,616,057 | B1 | 9/2003 | Kelly et al. |
| 7,147,071 | B2 * | 12/2006 | Gering ............... B60H 1/00278 237/12.3 B |
| 7,966,280 | B2 | 6/2011 | Kojima et al. |
| 9,404,409 | B2 * | 8/2016 | Pursifull ................... F01N 5/02 |
| 2002/0125334 | A1 | 9/2002 | Remond |
| 2002/0187376 | A1 | 12/2002 | Nishiumi |
| 2008/0195564 | A1 | 8/2008 | Kojima et al. |
| 2009/0005912 | A1 | 1/2009 | Srivastava et al. |

* cited by examiner

METHOD FOR MOTOR VEHICLE INTERIOR CLIMATE CONTROL

CROSS-REFERENCE TO RELATED APPLICATIONS

This application is a divisional of U.S. application Ser. No. 12/984,554 filed Jan. 4, 2011, which, in turn, claims foreign priority benefits under 35 U.S.C. § 119 (a)-(d) to DE 10 2010 000 727.7, filed Jan. 7, 2010, the disclosures of which are hereby incorporated in their entirety by reference herein.

TECHNICAL FIELD

The present invention relates to a method for climate control for an interior of a motor vehicle, and more specifically to such a method involving verifying and/or updating a thermodynamic model of a vehicle climate system.

BACKGROUND

Systems for climate control for an interior of a motor vehicle may comprise heating, ventilation and/or air conditioning and/or cooling of the interior. An increasing number of passenger cars and other motor vehicles are equipped with systems that involve automatic temperature control. In most such systems, control inputs of the driver and data supplied by sensors are used to introduce appropriately temperature-controlled and/or air-conditioned air into the interior, in particular the passenger cabin of the motor vehicle, in order to achieve a pleasant temperature control for the occupants.

Automatic temperature control systems in general comprise one or more sensors for acquiring control variables of the interior that are relevant to climate control (such as air temperature in the interior), a control element for selecting a desired temperature, and a device for controlling an air stream flowing to the interior. The quantity, direction and/or temperature of the air stream may be controlled. If, for example, the measured temperature of the interior air is below the desired temperature, then the air stream supplied to the cabin is heated more strongly or cooled to a lesser degree, and/or the intensity (rate of flow) of the heated or cooled air stream is correspondingly changed. In this case, use is made of control algorithms which are preferably optimized to reach a desired temperature quickly and to avoid control oscillations. With such systems, the quantity, the temperature and the distribution of the temperature controlled and/or air-conditioned air introduced into the interior is generally adequately adapted to the comfort requirements of the occupants for a stationary vehicle and given ambient conditions.

If conditions are variable, though, for example when the vehicle interior is to be heated up to comfortable temperatures in the event of a start in cold surroundings, the known algorithms are frequently not efficient. A substantial outlay is required to adapt the control algorithm to the characteristics of a specific vehicle that is, for example, dependent on the size, shape and equipment of the cabin and likewise on the type of engine and other drive components. Even if the control algorithm is optimized for a multiplicity of climatic conditions, the existing controls are frequently not optimal under other climatic conditions.

Many variables and considerations may also have an effect on the interior climate, for example, if there is a change in the thermodynamic properties of the interior as a function of the number of persons in the vehicle, opening of a door, the presence/absence of a cargo space cover, and the presence/absence and/or temperature of a load. Other pertinent factors may include different equipment or different chassis variants of a particular base vehicle.

An additional problem may be posed by engines that operate at a high efficiency and therefore do not produce sufficient heat to heat up the interior in cold ambient conditions. The heat generated by the engine, which is not constant all the time, must therefore be stored and used as effectively as possible. Thus, for example, it is necessary to avoid a drop in the ventilation temperature through an excessive cooling of the engine because of the HVAC system, but on the other hand the interior is to be heated up to the desired temperature as quickly as possible, particularly in the case of a cold start at low ambient temperatures.

EP 1 159 520 B1 discloses a method for controlling and/or regulating thermal flows in the motor vehicle, in which a forecast is made for future load states of the engine cooling system on the basis of a model, and the thermal flows of the engine cooling system and of the climate control system are controlled and/or regulated in a fashion taking account of said load states. The model used takes account in this case of the variables relevant to the driving state and the thermal inertia of the engine cooling system, but is optimal in each case only for a specific vehicle with a specific drive system as well as specific thermal properties of the vehicle, in particular of the vehicle interior.

SUMMARY

A method for climate control for an interior of a motor vehicle achieves an optimal temperature control even during the heating-up phase after a cold start, particularly for a multiplicity of vehicle and drive variants as well as for interiors of different configuration.

In a disclosed embodiment, a method for climate control for an interior of a motor vehicle comprises acquiring climatically relevant data of the interior and/or surroundings of the vehicle, creating a thermodynamic model of a vehicle climate system (the climate system including the climate control system and the interior itself), applying a thermal disturbance to the vehicle climate system, and verifying and/or adapting the thermodynamic model based upon a reaction of the interior system to the thermal disturbance.

In a further disclosed embodiment, a method for climate control for an interior of a motor vehicle comprises acquiring climatically relevant data of the interior and/or surroundings of the vehicle, creating a thermodynamic model of a vehicle climate system, the model including at least one of a first thermal capacity of the interior and a first heat loss of the interior, introducing into the interior a quantity of air having a temperature different from an existing interior temperature, calculating at least one of a second thermal capacity of the interior and a second heat loss of the interior existing after the air quantity is introduced into the interior, and adapting the thermodynamic model to include at least one the second thermal capacity and the second heat loss.

BRIEF DESCRIPTION OF THE DRAWINGS

The invention is explained in more detail below by way of example with the aid of the drawings in which, in schematic form in each case and as part of an exemplary embodiment of the inventive method.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In exemplary embodiments of the method described herein, data relevant to interior climatic conditions of the vehicle and/or the surroundings are acquired. These can be acquired by appropriately designed and arranged sensors, and constitute measured values relevant to current thermodynamic state variables of the vehicle and/or the surroundings. Such conditions and variables are measured/detected by sensors of known type, and the data gathered by said sensors may be transmitted, for example, via a high-speed data bus system, for example a CAN bus.

Data relating to the vehicle and/or the drive may include, for example:
  interior volume and thermal capacity of the vehicle cabin and/or of the interior, thermal transfer coefficient for the thermal mass of the interior;
  thermal insulation and/or thermal conduction coefficient with the outside;
  area and inclination angle of windows that are relevant for insolation and heat exchange;
  characteristic diagram of the heat development of the engine as a function of the rotational speed and of the load, which may be determined, for example, with the aid of the gas pedal position and/or with the aid of the instantaneous fuel consumption;
  parameters for predicting the available heat as a function of typical operating cycles;
  thermal capacity of the engine cooling circuit;
  air stratification or temperature differences between various outlet nozzles given different air distribution requirements;
  effectiveness of the air heating; and/or
  electrical air heating, generated heat quantity.

Said data may be permanently prescribed or, if appropriate, may be determined starting from an initial value by calibrating the model and changed based upon the calibration.

Data relating to the current operating conditions may include, for example:
  external/ambient temperature;
  humidity of the external air and/or the internal air;
  insolation (solar heating); and/or
  vehicle speed, measured relative to ground or to the ambient air.

Further measured values that may be used to refine the model may include, for example:
  coolant temperature and coolant throughput;
  ambient temperature and air speed;
  circulating air temperature and circulating air stream;
  fan operating current and fan power;
  supply air temperature and supply air stream;
  desired temperature of the cabin and/or of the interior;
  generation of heat and moisture inside the cabin by the occupants;
  additional loads on the engine such as generator and compressor of the climate control system; and/or
  heat losses from opening doors, trunks, hatches, windows, and/or a roof window (sun roof).

Data that serve to validate the model and/or specify the extent to which the desired values are achieved, and which are determined by sensors and made available for control purposes, concern, in particular:
  ventilation/heating system air outlet temperature;
  internal air temperature of the cabin, and/or
  air humidity of the cabin air.

Furthermore, desired values that can, for example, be input by a user via appropriate control elements or be determined therefrom, if appropriate with the aid of further data. The desired values may, however, also be permanently prescribed and/or may be determined from the climatically relevant data of the vehicle and/or the surroundings.

A thermodynamic model that maps the essential thermodynamic properties of the vehicle climate system (which includes the climate control system and the interior of the vehicle) is constructed, and controlled variables are determined for the climate control in order to drive control elements of the climate control system appropriately and thereby influence the climate of the interior. It is thus possible, for example, to change the characteristics of an air stream supplied to the interior by the climate control system. These characteristics may include, for example, the direction, strength, temperature, and/or humidity of the air stream. The air stream may be produced by a ventilation blower (a fan) and/or by ram pressure of vehicle movement.

The thermodynamic model is of self-learning design, meaning that verification and/or adaptation of the model is carried out by feedback of climatically relevant measured values. The climatically relevant measured values are evaluated in such a way that it is possible to ascertain when the actual properties of the vehicle climate system and/or of the thermodynamic properties of the interior of the motor vehicle deviate from the parameters used in the model. If such deviations are found, the corresponding model parameters are automatically adapted to match the actual, measured values. Even when no substantial deviations are found, the measured values can be used to improve the model, for example to refine the grid of the determination points for interpolations.

The self-learning nature of the method makes it possible to adapt to different vehicle types, powertrain types, types of vehicle equipment, as well as to different uses of the interior. Furthermore, an optimal setting is possible for a multiplicity of combinations of operating parameters and interior and ambient conditions, without adversely affecting the setting for other combinations of parameters and conditions, since parameters and algorithms fit for the relevant situation are always available in this way.

In achieving the self-learning nature, a reaction of the vehicle climate system to a prescribed thermal disturbance is determined and used for verification and/or adaptation of the model. Such a calibration may be carried out, for example, by determining the reaction of a heat source and/or a heat sink to a thermal disturbance. Such a heat source can, for example, be the heat source serving to heat up the blower air, such as the engine cooling system of the motor vehicle. The vehicle interior also acts as a heat sink because of the heat losses to colder surroundings. By contrast, the interior acts primarily as a thermal capacitor, particularly during a heating-up phase. If, however, it is necessary to maintain an internal temperature that has been reached, what comes to bear is the effect of the chiefly convective heat losses to the outside, that is to say the heat sink.

If a defined heat quantity is then removed from the heat source or fed to the heat sink by introducing a thermal disturbance in a targeted way, the measured values of the temperature of the heat source and/or of the heat sink, for example the radiator temperature or the interior temperature, can be used to obtain data relevant to the model. The thermodynamic model on which the disclosed method is based is automatically adapted on the basis of these measured values, which describe the reaction of the heat source and/or the heat sink to the thermal disturbance, and which therefore permit a conclusion to be drawn concerning the thermodynamic properties of the heat source or of the heat sink.

As a result, the climate control adapts automatically to a multiplicity of operating states without this requiring further control elements of the climate control system than are required in any case for climate control, or further sensors.

Figure 1:
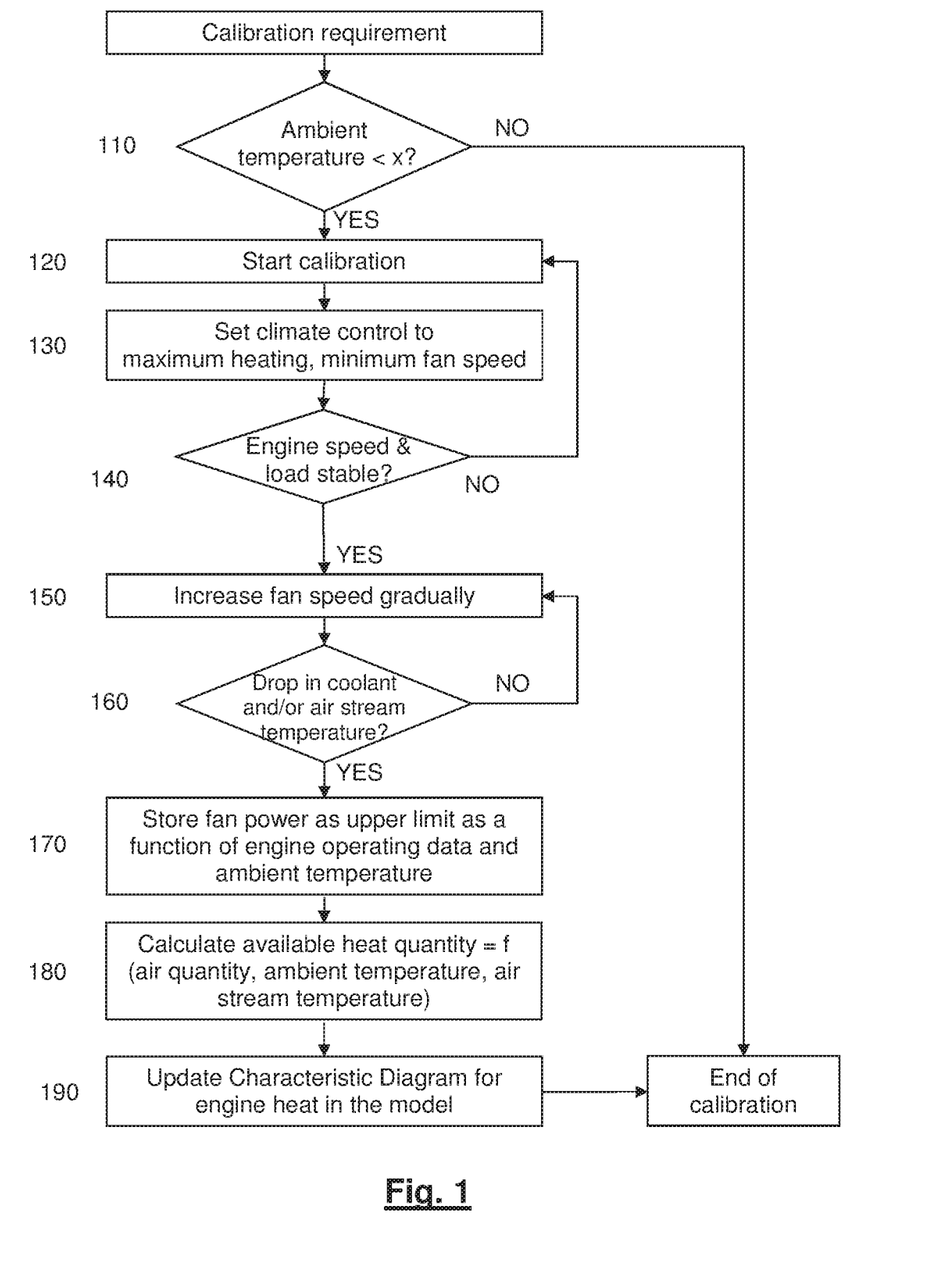
FIG. 1 shows a method for determining the maximum available heat of the heat source and/or the maximum power of a heating blower for use in a calibration of a thermodynamic model.

As a preliminary step, a maximum power of a heating blower may be determined for which it is still not possible to ascertain a substantial drop in temperature of the heating air conveyed by the heating blower given a current combination of operating parameters of the motor vehicle (see FIG. 1). In the case of this calibration, the power of the heating blower is increased gradually or in steps until a drop in the heating air temperature supplied by the blower is observed. If the heating air is, for example, heated by the engine cooling system, this means a drop in temperature which is such that more heat is extracted from the heat source than the latter can make available. Since the development of heat by the engine is a function, in particular, of the rotational speed and the engine load or engine power, the maximum power of the heating blower that is determined in this way is also a function of said operating conditions of the motor vehicle. The power of the heating blower can therefore be limited to values below this maximum power in the case of heating control. The result of this is that no more heat can be extracted from the heat source, in particular the engine cooling system, than the latter can supply. Moreover, a substantial gain in comfort is attained for the occupants from ensuring a constant blower air temperature.

Referring to FIG. 1, at block 110 it is determined (on the basis of a time-triggered or event-triggered cycle) whether the ambient temperature (that is, the temperature external to the vehicle) is less than a limit value x. The limit value may be permanently prescribed or may be a function of one or more parameters such as, for example, the interior temperature. If "YES," the calibration process is initiated at block 120, and the first step is block 130 where the heating is set to maximum heating, but initially with a low fan power. At block 140, engine speed and engine load are monitored and if they are relatively constant, the fan power is raised in increments or gradually at block 150. If the engine speed and/or engine load do not remain constant during this process (block 140, "NO"), the method returns to block 120 and the calibration process restarts.

As the fan speed is increased, the temperature of the air conveyed by the fan and/or and the temperature of the heat source used for the heating (for example, the engine radiator/coolant) is monitored by appropriate sensors. If the temperature drops by an amount that exceeds a prescribed tolerance range (block 160, "YES"), the relevant fan power is stored as a maximum value at block 170. At block 180, the relevant available heat quantity, which is a function of the conveyed air quantity, the ambient temperature and the heating air temperature, is calculated. At block 190, the characteristic diagram of engine heat used in the model on is updated to incorporate the available heat quantity calculated at block 180. In this way, the validity of the model for the generation of heat can be checked, and the model can, if appropriate, be adapted to the current situation and/or a vehicle type with a specific type of engine.

A further system calibration may be carried out to determine the thermal capacity of the interior of the motor vehicle. To this end, a known air quantity with an air exit temperature different from the existing interior temperature is introduced into the interior, and the thermal capacity is determined by measuring the resulting temperature rise or temperature drop. If, for example, the heating blower introduces into the vehicle interior a predetermined air quantity with a known temperature, then if a rise in temperature is concerned the latter can be measured with a certain delay and to a lesser extent than an increase in temperature of the interior. The course of the temperature rise and subsequent drop possibly following thereupon can be used to determine the thermal capacity of the vehicle interior system, which includes the objects contained therein and of the surfaces and/or of the parts of the walls of the vehicle interior that are in thermal contact with the vehicle interior.

Figure 2:
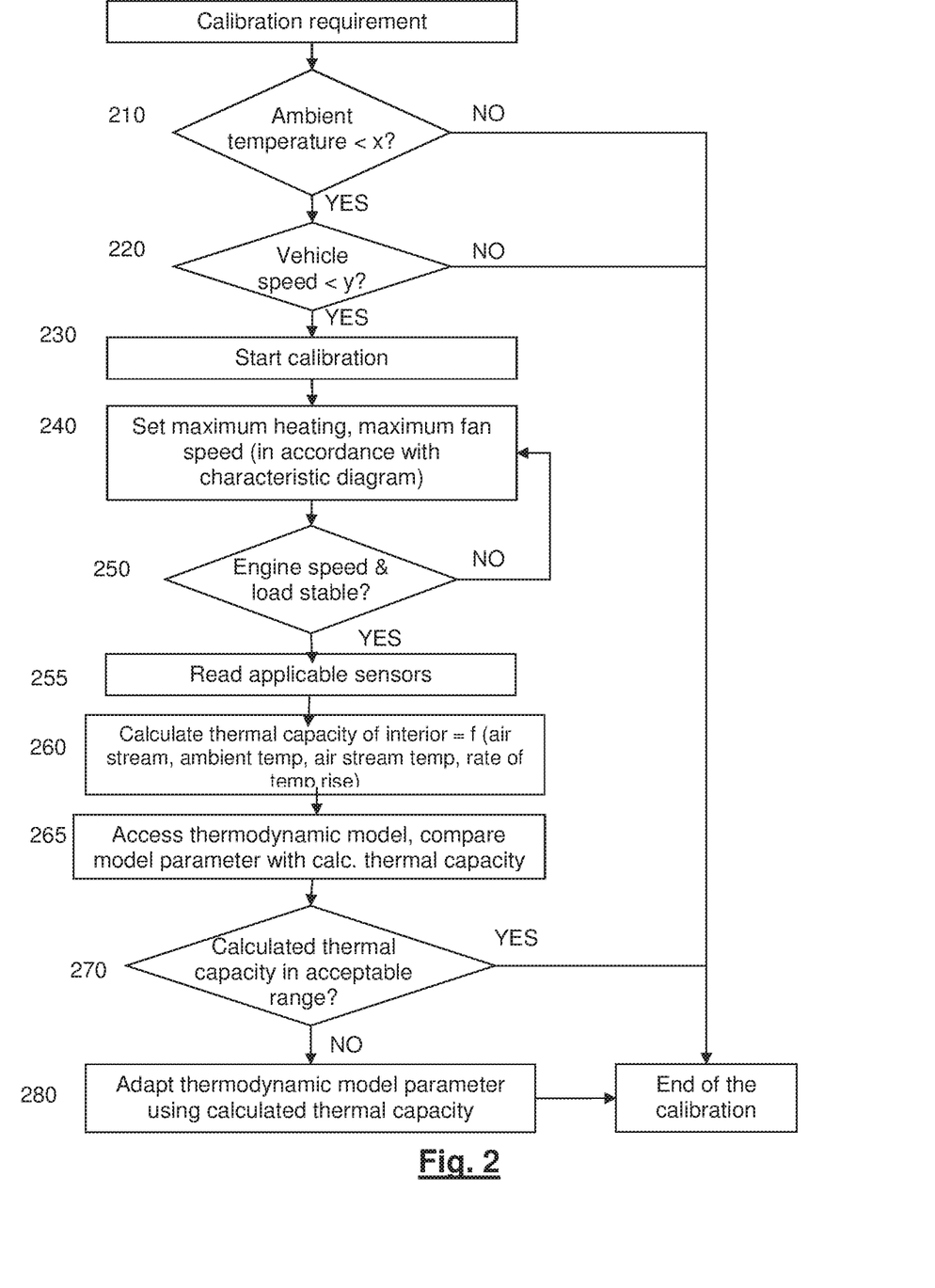
FIG. 2 shows a method for determining the thermal capacity of a vehicle interior for use in a calibration of a thermodynamic model.

In accordance with the exemplary embodiment, illustrated in FIG. 2, a calibration method for determining the thermal capacity of the interior may be instituted on the basis of a time-triggered or event-triggered start command. If the ambient temperature is below a limit value x (block 210, "YES") and the vehicle speed is below a limit speed y (block 220, "YES"), the calibration is initiated at block 230. At block 240, the climate control system is set to maximum heating, and the fan power is set for a given time interval to the maximum power determined at block 180 in FIG. 1.

When the engine speed and the engine load are constant (block 250, "YES"), the thermal capacity of the interior is determined from the temperature reactions, determined by the vehicle internal air sensor system, as a function of the air stream of the heating blower, of the external temperature, of the temperature of the heating air, and of the rate of the temperature rise of the interior (block 260). At block 270, the value of thermal capacity calculated at block 260 is compared with the value assumed in the model, and if the two values are sufficiently close (within an acceptable range), no change to the model is undertaken (block 270, "YES"). If the values are not within the acceptable range (block 270, "NO"), the value used in the model is appropriately updated at block 280. It is thereby possible to determine changes of the thermal capacity of the interior that result, for example, from a different occupancy, and to use said changes to optimize the heating control, in the same way as it is possible to adjust the heating control for each interior of different variants of motor vehicles.

It is likewise possible to determine the heat losses to the surroundings, in particular through thermal conduction and thermal radiation. These data enable an optimal temperature control adapted to the respective properties of the vehicle interior. Since the thermal capacity is a function of the equipment of the cabin and of further factors—such as, for example, the volume and temperature of any load contained in a cargo space that is in thermal contact with the vehicle cabin—an optimal temperature control is always possible hereby. Since, in particular, the heat losses owing to thermal conduction to the outside are a function of different variables, for example the vehicle speed and the external air temperature, the control is hereby automatically optimized even for the most varied ambient conditions.

Figure 3:
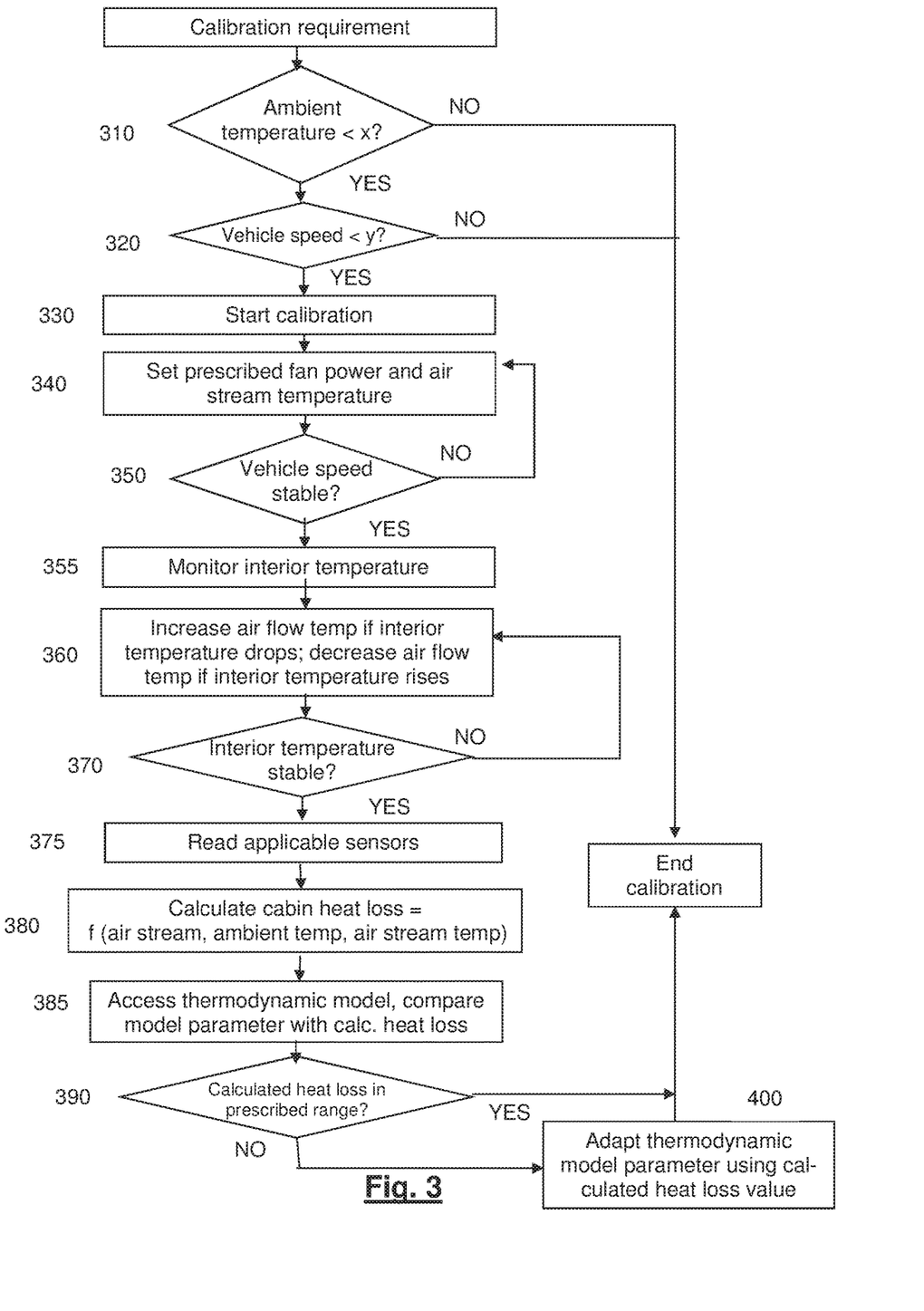
FIG. 3 shows a method for determining the heat losses of a vehicle interior for use in a calibration of a thermodynamic model.

As illustrated in FIG. 3, a calibration method for determining the heat losses of the cabin begins with steps similar to those described in relation to FIG. 2. At block 360 the interior temperature is monitored and the heating air temperature is controlled to maintain the interior temperature at a constant level: The heating airflow temperature is increased if the interior temperature drops, and the heating airflow temperature is decreased if the interior temperature rises. With this stable internal temperature, the heat loss of the interior may be calculated (block 380) on the basis of the quantity of the air stream delivered by the fan, the external/ambient temperature, and the temperature of the heating air. The calculated value of cabin heat loss is then compared with the value used in the model and, if the difference is within a prescribed range (block 390, "YES"), it can be assumed that said difference corresponds to a change relevant for the heating control, and so the heating control is improved by accepting the determined data into the basic model (block 400).

If the difference is not within the prescribed range (390, "NO"), the calibration ends with no change being made in the model. If the difference is less than the prescribed range, it may be considered insignificant. If the difference is greater than the prescribed range, no change is made in the model since in all probability the large deviation is caused by an unexpected operating situation, for example by an open tailgate or an open window.

When a reservoir used in the air conditioning of the interior, or a heat source or heat sink is not available to a sufficient extent, it is possible for the air conveyed by a ventilation blower to be led into the interior preferably through selected ventilation nozzles. In the case of heating control, this means that insufficient heat is available for heating the entire interior. Such a situation can, for example, occur during a cold start when insufficient engine heat is available, and also when an electrical air heating system, if present, is not supplying sufficient heat to warm the interior to the desired temperature. In this case, the air stream of the heating blower can lead the available heat onto selected action sites in a targeted way, that is to say can be concentrated, in particular, on those outlet openings that maximize the heating sensed by the occupants. By way of example, this can be those outlet openings that lead the warm air onto the hands of the driver. In order to achieve an adequate temperature of the heating air despite a low available power of the heat source, it is possible in this case to reduce the power of the heating blower correspondingly. The result of this is to take the best possible account of the occupants' need for comfort even given unsatisfactory provision of heat.

A series of calibrations may be carried out to determine a reaction of the vehicle climate system to a prescribed thermal disturbance under different combinations of operating and/or ambient conditions of the motor vehicle. It is thereby possible to produce a multidimensional characteristic diagram that is vehicle specific and that enables an optimal climate control in each case under the conditions mentioned.

The disclosed method can, in particular, enable a predictive climate control. Such a predictive control can be based, for example, on data that are supplied for the route ahead by a navigation system and/or an automatic traffic sign detection system. This allows a prediction of the quantity of the heat available in the future for heating the interior of the motor vehicle. Such data, which are relevant for the heating control, can be, for example, the estimated vehicle speed based upon the expected course of the road, state of the road, traffic conditions and/or speed limits, as well as positive gradients and stretches of negative gradient. It is possible hereby to determine the available heat in a predictive way and to control the ventilation blower correspondingly.

Typical operating cycles for the relevant motor vehicle may be determined by the storage of data that characterize the operating cycles of the motor vehicle, thus enabling a predictive determination of the operating state and, for example, of the available heat quantity, and thus a predictive climate control. Such typical operating cycles can be determined, in particular, by the duration of the journeys, the speeds, the stop times and the stretches of positive and negative gradient that have been overcome. The likelihoods (probabilities) of the future occurrence of specific operating states can be determined by a statistical evaluation. A driver-specific driving style can also be taken into account hereby. On the basis of a current combination of operating parameters, the availability of heat and/or requirement for heat can be predictively inferred within the framework of stored operating cycles, and a control can be correspondingly adapted.

Figure 4:
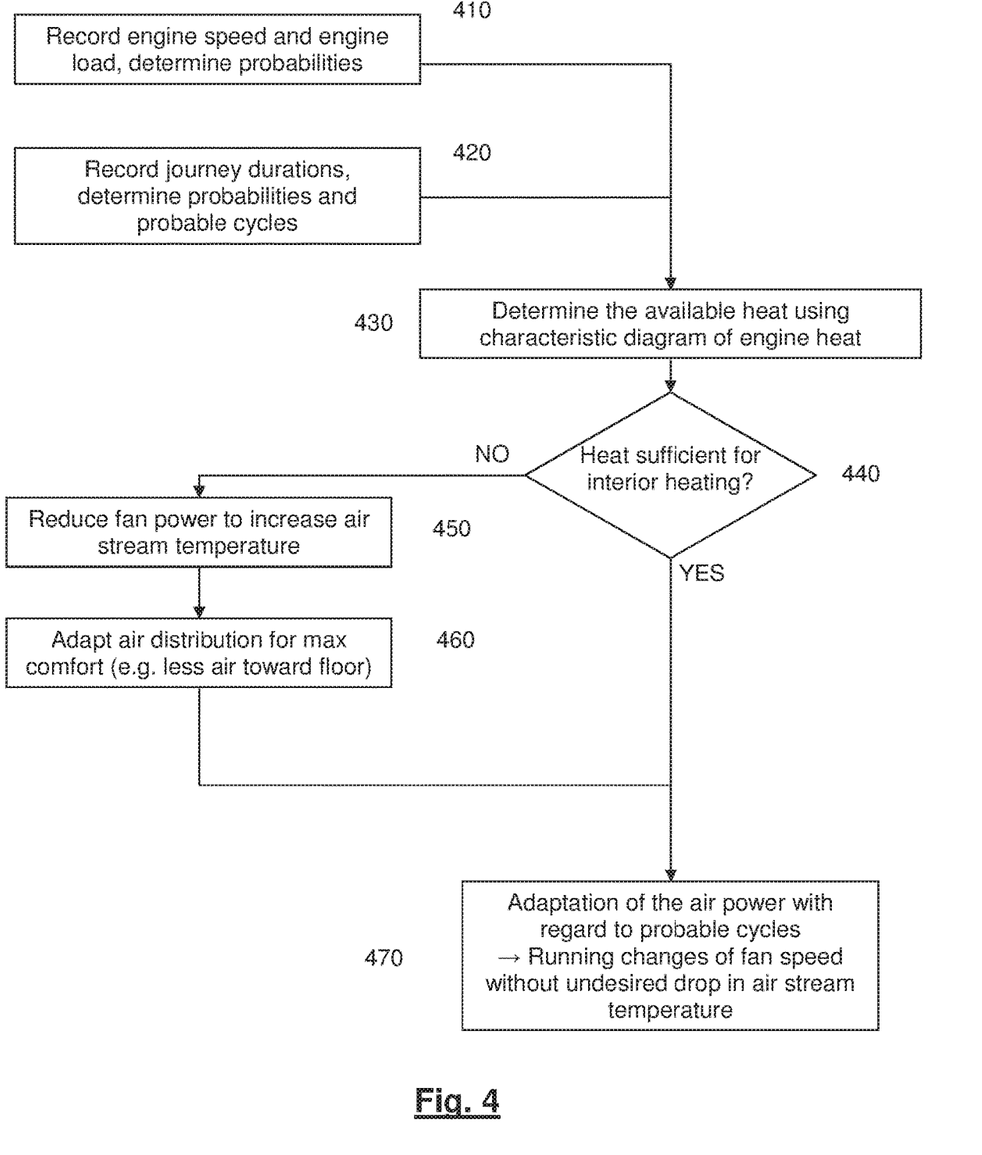
FIG. 4 shows the determination of typical operating cycles of a motor vehicle.
Figure 5:
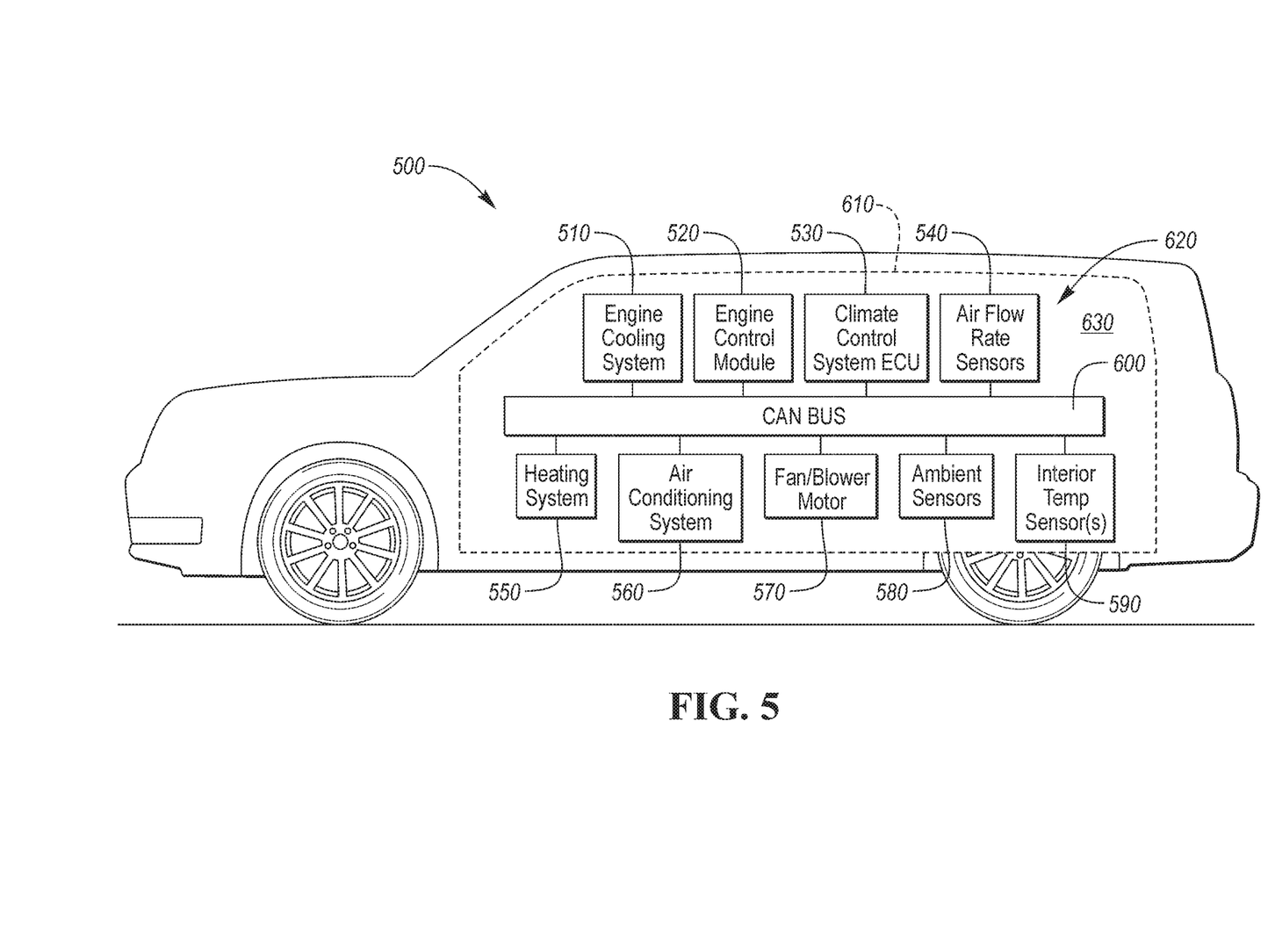
FIG. 5 is a side view of vehicle having an interior climate control system.

FIG. 4 depicts a method for determining typical operating cycles of the vehicle with the aim of predicting how to use available engine heat in an optimum fashion to maintain a desired/comfortable vehicle interior temperature. Such a process may be necessary, for example, when the vehicle powertrain is of a type that does not produce large amounts of excess heat. At block 410, engine speed, engine load and, if appropriate, further data are continuously recorded and used to determine probabilities for typical cycles. At block 420, journey durations are recorded and used to determine probabilities for typical cycles. At block 430, the probable/typical cycles determined are used to determine heat quantities available for typical cycles. If the expected available heat quantity suffices to heat up the cabin (block 440, "YES"), the power of the fan (heating blower) is adapted in accordance with a predictive control. Abrupt changes of the power of the blower are hereby avoided without the occurrence of undesired changes in the temperature of the heating air. If the heat is presumably insufficient to heat up the interior (block 440, "NO"), the fan power is reduced, thereby rendering it possible to reach a higher temperature of the air conveyed into the interior by the fan.

Furthermore, the air stream of the heating blower may be directed onto selected parts of the vehicle interior and, in particular, be concentrated onto those outlet nozzles that are particularly important for the subjective comfort of the occupants, for example those nozzles that direct the air stream onto the hands and/or face of the driver. The air stream from outlet nozzles less important for comfort can be correspondingly reduced. This heat distribution can be gradually transformed into the "normal" air stream distribution as soon as sufficient heat is available to heat up the interior.

Furthermore, preferred areas for heating the internal air can be those surfaces in the vicinity of which the occupants subjectively have a particular sensitivity to cold during a cold start. A "warm air cushion" can be produced at such surfaces by targeted direction of a warm air stream in order to increase this subjective perception of comfort. Depending on the heat available, such an air distribution can also gradually be transformed into the normal heat distribution, since the heat loss owing to such a heat cushion is very high.

In a similar way, the cooled air stream of a climate control can be concentrated on preferred exit nozzles in the event of insufficient cooling power of a climate control system, for example during a start when the interior is strongly heated by the ambient temperature or by insolation (solar heating), as a result of which it is possible to take account of this subjective perception of comfort of the occupants. For example, the air stream can be directed only onto the exit nozzles of the front seats when the rear seats are not occupied. Such a control can also be used to remove or avoid fogging of the windows.

In addition to the optimization of the comfort of the occupants, the disclosed methods may also be applied to pursue different objectives such as, for example, minimizing fuel consumption and/or of the pollutant emission of the vehicle. A control taken in this respect can always ensure an overall optimal control in accordance with weighting of the individual objectives.

The disclosed methods for heating control may also be used in a similar way to control the cooling of the vehicle interior in the event of increased external temperatures, and/or to control the air humidity in the vehicle interior. In the case of such a method, it is also possible to determine the thermodynamic data of the vehicle interior by a calibration, and thereby to improve the model on which the control is based.

Calibrations such as are described above can be carried out at prescribed intervals or as a function of the current measured values of the vehicle and/or the surroundings. It is possible for a time-controlled calibration to be performed at time intervals which correspond to typical time scales and at which the parameters of the model that are to be determined can change, for example in accordance with a typical duration of a single journey when a change is to be expected in the thermal capacity through different occupancy or loading of the interior. Given an event-controlled calibration, the calibration operation can, for example, be carried out at the beginning or shortly after the beginning of a journey, or when a change in the thermodynamic behavior of the vehicle interior is to be expected based upon sensor data indicating that, for example, one or more doors of the vehicle have opened/closed or use of safety belts have changed, thereby indicating changed loading or a changed number of passengers.

The calibration preferably takes place in a way that it is not noticed by the occupants, or at least does not impair the comfort of the occupants. By way of example, to this end air is introduced into the interior only for a short time and with a temperature increased only so far that the reaction of the interior temperatures can be determined with sufficient accuracy. Such calibrations may be carried out under different operating and ambient conditions and stored as a characteristic diagram, so that said calibrations are available for the control under comparable conditions. A renewed calibration can therefore take place less often when the characteristic diagram is sufficiently densely populated with measured values.

If it is determined during a calibration that the measured temperature change agrees with the basic model, there is no need to change the model. Nevertheless, the measured value(s) can be stored in the relevant characteristic diagram in order to obtain a denser population with measured values. A more reliable interpolation is hereby possible in the case of intermediate values.

The calibration operation may be initiated externally, such as via the diagnosis function of the vehicle, in order to refine the calibration during the development of the vehicle, for example, or else during a stay in the workshop and/or for service, in order to obtain the calibration for the current vehicle.

In the disclosed embodiments, the basic thermodynamic model may be automatically adapted to the vehicle type, the type of engine, the type of drive and the interior trim of the vehicle. In the case of activating the motor vehicle for the first time (start up), it is therefore possible to proceed from a nonvehicle-specific thermodynamic model. By applying the method during the activation and/or during use of the vehicle, the parameters relevant to the model are automatically determined by the calibration such that automatic adaptation of the model to different levels of vehicle equipment is possible. Since there is at present an increasing multiplicity of variants and combinations of different equipment features of motor vehicles, this results in a substantial simplification when implementing a climate control in a motor vehicle.

Apparatus for climate control in accordance with the above-described methods can, for example, comprise sensors and/or at least one interface of an information system of the motor vehicle, for example a bus system, for the acquisition of climatically relevant data of the vehicle and/or of the surroundings, and also storage means for storing a thermodynamic model of the climate control system and/or of the interior, processor means for determining controlled variables for the climate control, and control means for driving control elements of the climate control, for example a blower, or for driving flaps for controlling air streams. The stored thermodynamic model can be automatically improved by climatically relevant data that represent the reaction of the climate control system or of the vehicle interior to variations of the climate control, and is therefore self-learning. It is thereby possible to achieve an always optimal climate control, and at the same time to avoid a substantial outlay for adaptation to a specific type of vehicle equipment. Storage and processor means as well as, if appropriate, an interface of an information system and control means can be combined in one control device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
a controller programmed to, upon setting climate control heating to maximum and a speed of a fan to minimum,
increase the speed,
measure a temperature change in a heat source used for the heating or in air conveyed by the fan,
calculate an updated available heat quantity based on at least the temperature change, compare the updated available heat quantity with an original value to generate a difference, and substitute the updated available heat quantity for the original value into a thermodynamic model of the vehicle climate system residing in and implemented by the controller responsive to the difference being greater than a prescribed tolerance range.

2. The system of claim 1, wherein the controller is further configured to perform the setting responsive to ambient temperature being less than a limit value.

3. The system of claim 1, wherein the controller is further configured to perform the increase only if engine speed is constant.

4. The system of claim 1, wherein the controller is further configured to perform the setting on a basis of a time trigger or an event trigger.

5. The system of claim 1, wherein the controller is further configured to perform the increase only if engine load is constant.

6. The system of claim 1, wherein the controller is further configured to store a power associated with the fan as a maximum value responsive to the difference being greater than the prescribed tolerance range.

* * * * *